Jan. 12, 1971  W. T. RAUCH ET AL  3,554,004

FLUIDIC GAS RATIO METER

Filed Feb. 23, 1968

Inventors:
William T. Rauch,
Howard W. Avery, by Louis R. Moucha

United States Patent Office 3,554,004
Patented Jan. 12, 1971

3,554,004
FLUIDIC GAS RATIO METER
William T. Rauch, Voorheesville, and Howard W. Avery, Schenectady, N.Y., assignors to General Electric Company, a corporation of New York
Filed Feb. 23, 1968, Ser. No. 707,496
Int. Cl. G01n 33/00; F15c 1/12
U.S. Cl. 73—23                3 Claims

ABSTRACT OF THE DISCLOSURE

A fluidic device for measuring the ratio by volume of two known gases or for detecting the contamination of a gas includes a fluid amplifier oscillator circuit and readout means. A gaseous medium being monitored is supplied as the power fluid to a fluidic oscillator whose frequency is dependent upon the gas constant of the gas or gases. A proportional relationship exists between oscillator frequency and gas composition such that a means for reading out the oscillator frequency can be scaled to indicate the percent by volume of two known gases.

---

Our invention relates to a fluidic device for determining the ratio or composition of two known gases, and in particular, to a fluidic oscillator circuit provided with a means for reading out the oscillator frequency as a ratio or percent by volume of the gases.

There are many applications wherein it is necessary to determine the composition (ratio by volume) of two known gases, or to detect the presence of a foreign or a contaminating gas in a particular gaseous environment. As an example, rotating electrical generating equipment employing hydrogen gas as the cooling medium requires that air be excluded from the hydrogen medium in order to prevent possible explosion or other catastrophes induced by the mixture of hydrogen in air. In like manner, many processes in the chemical industry require a specific composition of two known gases for accomplishing a particular chemical reaction.

A conventional device for measuring the ratio of two known gases is an electrical Wheatstone bridge wherein a resistor in a first leg of the bridge is maintained in a reference gas medium and a resistor in a second leg is maintained in the gaseous medium undergoing analysis. The disadvantage of the Wheatstone bridge approach is that it requires a source of electrical energy which in some cases may not be readily available. Further, the use of electrical energy may become a source of potential danger in the case of gases having an explosive nature in the presence of a spark readily caused by the electrical circuitry.

Therefore, the principal object of our invention is to provide a gas ratio meter also functioning as a gas contamination detector which is of the fluidic type employing pressurized fluid as the actuating medium.

Another object of our invention is to construct the meter-detector on the principle that a fluidic oscillator has its operating frequency dependent upon the gas constants of the gaseous medium supplied thereto.

Briefly stated, our invention comprises a fluidic oscillator and means for reading out the frequency of pressurized fluid pulses developed by the oscillator. The fluidic oscillator is a circuit comprised by one or more interconnected fluid amplifiers and feedback networks for generating pressurized fluid pulses having the frequency thereof dependent on the gas constant of the gaseous medium supplied thereto. The readout means may be any type appropriate for indicating the oscillator frequency. In the case of a gas ratio meter, the readout means is scaled to indicate the ratio or percent composition by volume of one of two known gases supplied to the fluidic oscillator. In the case of a gas contamination detector, the oscillator frequency for a pure atmosphere of a particular gas is known and any deviation from such frequency is indicative of the presence of an undesired or contaminating gas.

The features of our invention which we desire to protect herein are pointed out with particularity in the appended claims. The invention itself, however, both as to its organization and method of operation, together with further objects and advantages thereof, may best be understood by reference to the following description taken in connection with the accompanying drawing wherein like parts in each of the several figures are identified by the same reference character, and wherein:

Figure 1:
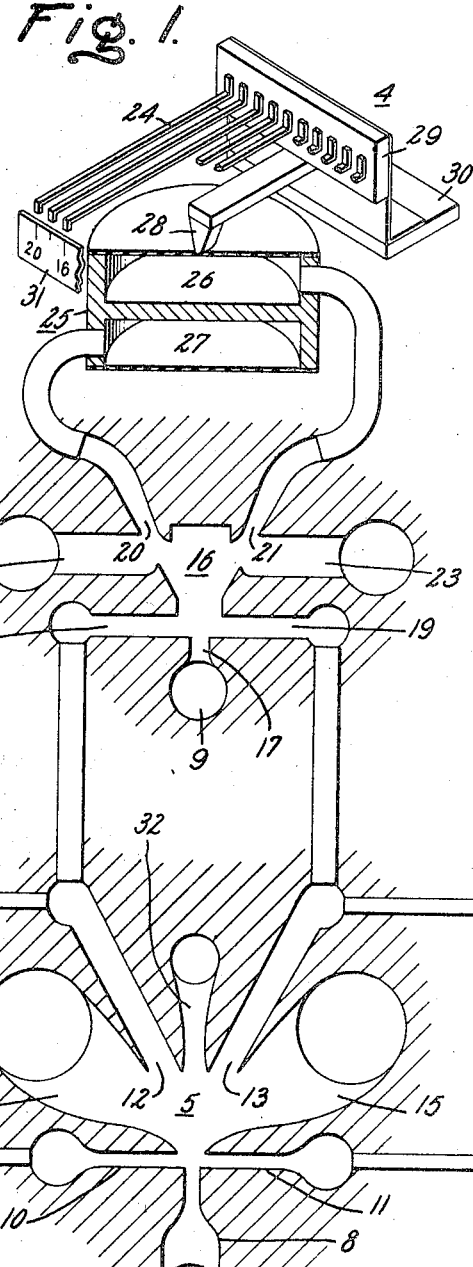
FIG. 1 is a view, partly in section, of a first embodiment of our invention employing a mechanically resonant readout means.

Referring now in particular to FIG. 1, there is shown a first embodiment of our invention which utilizes a readout means of the mechanically resonant type for indicating the ratio or composition by volume of two known gases, or the presence of a contaminating gas in a particular gaseous environment. Our invention is the combination of at least two components, a fluidic means 3 for generating pressurized fluid pulses having a frequency of oscillation dependent on the gas constants of the gases supplied thereto, and a readout means 4 sensitive to, and adapted for displaying the frequency of oscillation. In many cases a suitable transducer 25 will also be required to convert the fluid pulses to a form compatible for use by the readout means. It has been found that a proportional relationship exists between the oscillator frequency $f$ and the ratio or percent composition by volume of two known gases such that the readout means is readily scaled to read directly the gas ratio or percent. This proportional relationship is developed from the well known equation $\omega \cong \sqrt{RT}$ where $\omega = 2\pi f$, R is the gas constant and T is absolute temperature. Since the gas constant $R = 1544/MW$ where MW is molecular weight, it is evident that the oscillator frequency is inversely proportional to the square root of the molecular weight of the particular gaseous medium being monitored. Thus, the readout means must be chosen to have a frequency range response appropriate to the particular monitored gases. It should be understood that a particular proportional relationship between oscillator frequency and percent gas composition is valid only for identical fluid amplifier oscillator circuits since the operating frequency is also dependent on the geometry and size of the fluid amplifier element(s) and feedback network forming the oscillator circuit.

The means 3 for generating pressurized fluid pulses comprises one or more interconnected fluid amplifier elements and feedback networks for forming a fluidic oscillator circuit 3. In the particular oscillator 3 illustrated in FIG. 1, the oscillator comprises a conventional analog-type fluid amplifier 5 and a pair of feedback fluid flow passages 6 and 7 connected in negative feedback relationship from the outputs of fluid amplifier 5 to the control inputs thereof. Passages 6 and 7 provide a fluid flow inductive effect and may comprise long, narrow enclosed slots formed in the same base material in which the flow passages of the fluid amplifier element are formed to provide a unitary structure, or in the alternative, passages 6 and 7 comprise long lengths of small diameter tubing externally connected between the outputs and control inputs of the fluid amplifier. Fluid amplifier 5 is of conventional type and a detailed description of its structure will not be provided herein. For a detailed description of this device, attention is directed to U.S. Pat. No. 3,232,533 to W. A. Boothe, entitled "Fluid-Operated Logic Circuit" and assigned to the same assignee as the present invention, and in particular with reference to the description of FIG. 1 therein. The analog or momentum-exchange type device 5 includes a power fluid inlet 8 terminating in a restriction or nozzle for forming a constant flowing jet of the power fluid. Device 5 is of the active type in that the power fluid inlet is normally connected to a source 9 of constant pressurized fluid to thereby provide a constantly flowing power jet. In our application, the source of constant pressurized fluid is the gas being monitored. A pair of oppositely disposed control fluid inlets 10 and 11 terminate in nozzles for forming control fluid jets directed against opposite sides of the power jet for deflecting the power jet relative to a pair of fluid receivers 12 and 13 located downstream of the power nozzle. The power fluid received (pressure recovered) in the receivers is determined by the degree of deflection of the power jet caused by the net sideways momentum of the two opposed control jets, and in the absence of the control jets, the power jet would be directed midway between the two receivers. A pair of vent passages 14 and 15 are disposed adjacent the receivers on opposite sides of the power jet and in communication with the ambient atmosphere or fluid sump to relieve excess fluid pressure in the receivers. A center vent passage 32 may also be utilized.

The circuit comprising analog amplifier 5 and feedback network passages 6 and 7 generates alternating pressurized fluid pulses in receivers 12 and 13 upon connecting power fluid inlet 8 to constant pressurized gas source 9. Thus, the outputs of receivers 12 and 13 may be connected by suitable tubing directly to a readout means or intermediate transducer for determining the oscillator operating frequency. However, many oscillator circuits constructed from an analog-type fluid amplifier were found to have a rising frequency characteristic with increasing pressure of power fluid. Since the gas being monitored is not necessarily maintained at exactly constant pressure, some simple and inexpensive means should be provided for minimizing this variable frequency versus pressure characteristic to thereby obtain a more accurate gas ratio meter. An obvious solution is to choose an analog-type fluid amplifier oscillator circuit having an essentially flat frequency versus pressure characteristic. Another solution is the use of a second stage comprising a digital-type fluid amplifier 16. Many digital-type fluid amplifiers having drooping frequency versus pressure characteristics and thus provide a convenient means for balancing out the rising characteristics of the analog amplifier. It should be reemphasized that any fluidic oscillator circuit may be employed in our invention, the criterion being that the oscillator frequency be substantially pressure insensitive, i.e., independent of fluid supply pressure over a reasonable range of pressures.

The digital-type fluid amplifier 16 which compensates for the rising frequency versus pressure characteristic of the analog amplifier 5 is conventional and attention is directed to the above-referenced U.S. Pat. No. 3,232,533 for details thereof. Briefly, digital device 16 is a bistable element comprising a power fluid inlet 17 terminating in a nozzle for forming a constant flowing jet of power fluid, and a pair of oppositely disposed control fluid inlets 18 and 19 in communication with receivers 12 and 13, respectively, and terminating in nozzles for forming control fluid jets directed against opposite sides of the power jet. Power fluid inlet 17 is supplied from constant pressurized fluid source 9 which may be at the same pressure as supply 9 in the analog stage 5, and in any event comprises the gas being monitored. The control jets deflect the power jet within an interaction chamber defined by a pair of oppositely disposed and diverging side walls which obtain boundary layer action to confine the power fluid flow substantially exclusively to a corresponding one of two fluid receivers 20 and 21 positioned downstream of the power fluid inlet. The particular receiver obtaining the exclusive power fluid is determined by the differential pressure of the control fluid supplied to control fluid inlets 18 and 19. The output of digital fluid amplifier 16 is thus a differentially pressurized fluid signal comprising an alternating, constant amplitude, square wave pulse train having the same frequency as the pulsed signal developed at the output of analog amplifier 5. A pair of vents 22 and 23 are also preferably provided in digital device 16 adjacent the receivers and on opposite sides of the interaction chamber.

The readout means 4 for our gas ratio meter comprises a mechanically resonant device and in order to provide a compatible signal thereto, a pneumatic-to-mechanical transducer 25 is utilized for converting the pressurized fluid pulses in receivers 20, 21 to mechanical oscillations. Many types of mechanically resonant readout devices and pneumatic-to-mechanical transducers may be employed in our invention and as one particular example of the readout device, FIG. 1 illustrates a comb structure of resonant reeds 24 of the type conventionally employed in electrical frequency meters for indicating rotational speed of motors and generators. The mechanical excitation applied to reeds 24 is generated by a pneumatic-to-mechanical transducer 25 in the form of a diaphragm having chambers 26 and 27 connected to the alternate outputs 21 and 20, respectively, of digital amplifier 16. The pressurized fluid (gas) pulses in receivers 20, 21 induce mechanical vibration of diaphragm 25 which is transmitted through arm 28 in contact therewith to comb base 29. The unsupported ends of reeds 24 are free to vibrate when excited at, or very near, their resonant frequency. In general, only one or two reeds simultaneously vibrate with any significant amplitude. The supported ends of the reeds are connected to comb base 29 which is mounted on a light weight member 30 connected to an inner surface of the enclosure (not shown) of our gas ratio meter. A suitable indicia (scale 31) generally scaled in percent (of a first gas in another gas) is provided adjacent and in alignment with the free ends of reeds 24 for providing a readout of the specific gas composition (by noting the particular one or two adjacent reeds vibrating in response to the operating frequency of the fluidic oscillator). The number of resonant reeds 24 employed is dependent on the percent composition range of interest and the desired percent composition increments. Thus, for a gas ratio meter spanning the entire 0 to 100% composition range, a preferable number of reeds would be a minimum of 21 in order to obtain 5% composition increments, i.e., separation of 5% between adjacent reeds. In the case of our apparatus employed as a gas contamination detector, the percent composition range would probably be in the order of 0–10% as a maximum, the incremental percent composition spacing being in the order of 1% or less. Thus, for a 10% range and 1% increments, 11 reeds spaced at 1% composition intervals would be sufficient. The reeds are commercially available, each having a precisely defined resonant frequency and thus the desired incremental compositions may be correlated with respect thereto.

Figure 2:
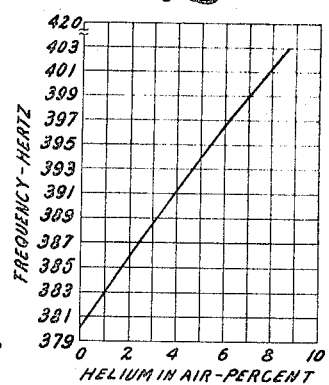
FIG. 2 is a graphical representation of the frequency versus percent composition characteristics obtained with our FIG. 1 embodiment for a helium contamination of air.

A specific embodiment of the device illustrated in FIG. 1 adapted for use as a 0–20% helium contamination in air detector utilized the two-stage oscillator employing analog-type fluid amplifier 5 and digital-type fluid amplifier 16, each having power nozzle dimensions of .040 inch width and .040 inch height and supplied with gas at 8 pounds per square inch gauge (p.s.i.g.) pressure. The readout means 4 employed 11 resonant reeds spanning a frequency range of 380–420 hertz (Hz.) at 4 Hz. intervals. The frequency versus percent composition characteristics are indicated partially in FIG. 2 wherein a sensitivity of approximately 2 Hz. frequency change for each 1% helium is indicated. A greater sensitivity may be obtained by employing other fluidic oscillators and the theoretically maximum sensitivity for helium is a frequency change of 43 Hz. for each 1% helium contamination in air at constant temperature. The specific FIG. 1 embodiment was the first model constructed to prove feasibility of our invention and no effort was made to obtain greater sensitivity. With present state of the art fluidic oscillators, sensitivities of 10 Hz. for 1% helium are readily obtained. Thus, a reed spacing at 1 Hz. intervals would indicate contaminant levels of 0.1% per reed in the 400 Hz. range.

Our device can also be utilized as a GO-NO GO contamination detector wherein the oscillator frequency for a pure atmosphere of a particular gas is known, and any deviation of the readout frequency indicates the undesired presence (contamination) of at least one other gas.

Figure 3:
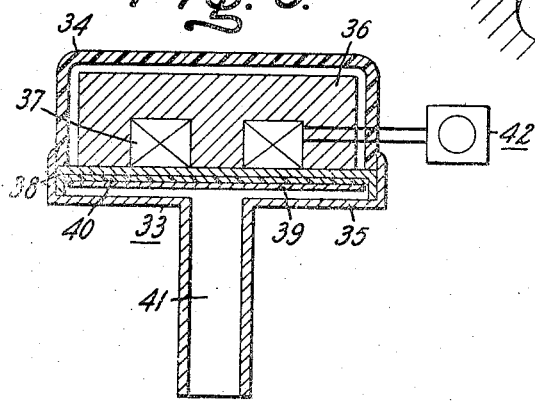
FIG. 3 is a view, partly in section, of a second embodiment of a readout means useful in our invention and utilizing a pneumatic-to-electrical transducer.

FIG. 3 is a view of a second embodiment of a readout means useful in our invention, and in particular, utilizes a pneumatic-to-electrical transducer 33 for converting pressurized fluid pulses to electrical pulse signals which are transmitted to a suitable electrical readout means 42 which may comprise a conventional frequency meter, oscilloscope or the like. Transducer 33 is a conventional microphone or earphone device comprising a housing consisting of a plastic cover 34 and outer base member 35 also constructed of a nonmagnetic material such as plastic or brass. A magnet 36 is bonded to an inner nonmagnetic base 38 and an electrical coil 37 is wound around the center leg of the magnet. A floating magnetic disc 39 is spaced from magnet 36 (and base 38) by means of an intermediate floating nonmagnetic (plastic) disc 40 which provides a variable air gap between the magnet and disc 39. Base 35 is provided with a fluid flow passage 41 for connection to one of the receivers at the output of the fluidic oscillator circuit. The pressurized fluid pulses at the output of the oscillator are transmitted through passage 41 and develop slight pressures on disc 39 thereby changing the air gap between magnet 36 and disc 39 and generating an electrical signal in coil 37 which is transmitted to the readout device 42.

Figure 4:
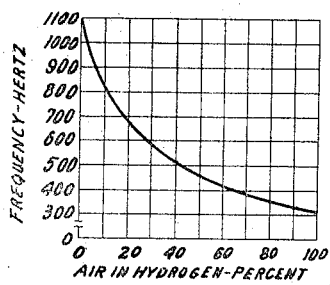
FIG. 4 is a graphical representation of the frequency versus percent composition characteristics for an air in hydrogen mixture.

The pneumatic-to-electrical transducer 33 in FIG. 3 is connected to one output of a fluidic oscillator comprising a single analog-type fluid amplifier provided with long, small cross section tubing connected from the receivers to control fluid inlets in negative feedback relationship to obtain the frequency versus percent composition characteristics illustrated in FIG. 4 for an air in hydrogen mixture. The fluid amplifier element had a power nozzle dimension of .020 inch width and .020 inch height and was supplied at a pressure of 0.4 p.s.i.g. The data for both the FIGS. 2 and 4 graphs was obtained at room temperature of 70° F. The frequency of the electrical signal detected in readout means 42 indicates the percent composition of air in hydrogen. It can be seen that the frequency versus percent composition characteristics vary quite linearly over a small percent composition range (0–10%) which is the case when utilizing the device as a contamination detector. The characteristics remain proportional but become more nonlinear over the entire 0 to 100% composition range when utilizing the device for the broader application of determining gas composition as seen in FIG. 4.

It is apparent from the foregoing that our invention attains the objectives set forth. In particular, our invention provides a fluid-operated gas ratio meter which comprises a fluidic oscilaltor constructed from elements known as fluid amplifiers having no moving mechanical parts, and a suitable readout means for detecting the frequency of the pressurized fluid pulses generated by the oscillator.

The readout means may also be provided with an intermediate transducer for converting the pressurized fluid pulses to an appropriate signal compatible with the readout means input. Our device has proportional frequency versus gas composition characteristics, and when used as a gas contamination detector has a linear frequency versus percent gas composition characteristic.

Having described two embodiments of our fluidic gas ratio meter, it is believed obvious that modification and variation of our invention is possible in light of the above teachings. Thus, any type of fluidic oscillator may be utilized for generating pressurized fluid pulses since our invention is the combination of a fluidic oscillator, transducer (if needed), and appropriate readout means for indicating the composition of a two gas mixture as a function of the oscillator frequency. The effect of temperature change can be considered by plotting a family of frequency versus percent composition curves for different temperatures of the gaseous medium. It is, therefore, to be understood that changees may be made in the particular embodiments of our invention described which are within the full intended scope of the invention as defined by the following claims.

What we claim as new and desire to secure by Letters Patent of the United States is:

1. A fluidic oscillator for generating pressurized fluid pulses having the frequency thereof dependent on the gas constant of a gaseous medium supplied thereto and comprising:
   an analog-type fluid amplifier and a digital type fluid amplifier connected in series circuit relationship, each amplifier comprising a power fluid inlet, a pair of opposed control fluid inlets and a pair of output receivers,
   a feedback network connected from the receivers of said analog-type amplifier to the control inlets thereof, the oscillator circuit formed by said analog-type amplifier and feedback network having a rising frequency characteristic with increasing pressure of power fluid supplied to the power fluid inlet thereof,
   the control fluid inlets of said digital-type amplifier connected to the receivers of said analog-type amplifier, said digital-type amplifier having a drooping frequency characteristic with increasing pressure of power fluid supplied to the power fluid inlet thereof to thereby balance out the rising frequency characteristic of the analog-type amplifier and provide an oscillator whose frequency is substantially power fluid pressure insensitive.

2. The fluid oscillator set forth in claim 1 and further comprising:
   means in communication with at least one receiver of said digital-type fluid amplifier for reading out the frequency of the pressurized fluid pulses, the frequency being known for a particular gas being monitored and supplied to the power fluid inlets of said analog and digital-type amplifiers whereby a deviation of the readout frequency indicates that the particular gas is being contaminated by another gas having a gas constant different from that of the particular gas.

3. A fluidic gas composition meter comprising:
   a fluidic oscillator for generating pressurized fluid pulses having the frequency thereof dependent on the gas constant of a gaseous medium being monitored and supplied thereto, said oscilaltor comprising
   at least one analog-type fluid amplifier having no moving mechanical parts and each comprising a power fluid inlet, a pair of opposed control fluid inlets and a pair of outlet receivers,
   a feedback network connected from the receivers to the control inlets of the analog fluid amplifier, the feedback network comprising a pair of enclosed fluid passages of sufficiently long length and small cross-sectional area or providing a fluid flow inductive effect, a digital-type fluid amplifier having the control fluid inlets thereof in communication with the receivers of the analog amplifier, means in communication with at least one of the digital amplifier output receivers for reading out the frequency fluid pulses wherein the frequency is proportional to the percent composition of the gaseous medium, and the monitored gaseous medium being supplied to the power fluid inlets of the fluid amplifiers consisting of the two known gases in a first mode of operation whereby the readout frequency indicates the percent composition by volume of the two gases, and consisting of at least one known gas in a second mode of operation whereby a change in the readout frequency indicates the presence of a second contaminating gas.

References Cited

UNITED STATES PATENTS

| | | | |
|---|---|---|---|
| 3,402,727 | 9/1968 | Boothe | 137—81.5 |
| 3,443,574 | 5/1969 | Posingies | 137—81.5 |
| 3,458,129 | 7/1969 | Woodson | 235—200 |
| 3,485,253 | 12/1969 | Boothe | 137—81.5 |
| 2,303,234 | 11/1942 | Schwarzkopf | 73—70.2 |
| 3,158,166 | 11/1964 | Warren | 137—81.5 |
| 3,238,960 | 3/1966 | Hatch | 73—205X |
| 3,273,377 | 10/1966 | Testerman | 73—23.1 |
| 3,373,600 | 3/1968 | Taplin | 73—32 |

FOREIGN PATENTS

| | | | |
|---|---|---|---|
| 404,809 | 3/1923 | Germany | 73—24 |

RICHARD C. QUEISSER, Primary Examiner

C. E. SNEE III, Assistant Examiner

U.S. Cl. X.R.

137—81.5; 235—201; 73—32